US011827842B2

(12) United States Patent
Mantri et al.

(10) Patent No.: US 11,827,842 B2
(45) Date of Patent: Nov. 28, 2023

(54) CALCITE SCALE CONTROL AGENT FOR GEOTHERMAL WELLS

(71) Applicant: ECOLAB USA INC., St. Paul, MN (US)

(72) Inventors: Dinesh Balkisan Mantri, Pune (IN); David Hardie Rodman, Townsville (AU)

(73) Assignee: ECOLAB USA Inc., St. Paul, MN (US)

(*) Notice: Subject to any disclaimer, the term of this patent is extended or adjusted under 35 U.S.C. 154(b) by 0 days.

(21) Appl. No.: 17/506,905

(22) Filed: Oct. 21, 2021

(65) Prior Publication Data
US 2022/0127514 A1 Apr. 28, 2022

Related U.S. Application Data

(60) Provisional application No. 63/105,596, filed on Oct. 26, 2020.

(51) Int. Cl.
C02F 5/00 (2023.01)
C02F 5/10 (2023.01)
E21B 37/06 (2006.01)
C09K 8/52 (2006.01)
C09K 8/528 (2006.01)

(52) U.S. Cl.
CPC ............. C09K 8/528 (2013.01); C02F 5/10 (2013.01); E21B 37/06 (2013.01); C02F 5/00 (2013.01)

(58) Field of Classification Search
CPC .......... C09K 8/528; C09K 8/52; C09K 8/536; C02F 5/00; C02F 5/08; C02F 5/10; C02F 5/12; F24T 2010/56; F24T 10/20; F24T 2010/50; F24T 10/10; F24T 10/30; Y02E 10/10; E21B 37/06
USPC ........................................................ 507/119
See application file for complete search history.

(56) References Cited

U.S. PATENT DOCUMENTS 3,965,027 A † 6/1976 Boffardi
4,204,953 A * 5/1980 Hodgson .................. C02F 5/08
159/DIG. 13
4,566,972 A 1/1986 Bennison et al.
(Continued)

FOREIGN PATENT DOCUMENTS

CN 106145393 A 11/2016
EP 353817 A1 * 2/1990 ................ C02F 5/10
(Continued)

OTHER PUBLICATIONS

Siega et al, Calcite-Scale Inhibition: The Case of Mahanagdong Wells in Leyte Geothermal Production Field, Philippines, Proceedings World Geothermal Congress, 2005. (Year: 2005).*
(Continued)

Primary Examiner — Joseph W Drodge
(74) Attorney, Agent, or Firm — Eric D. Babych; Barnes & Thornburg LLP

(57) ABSTRACT

The disclosure relates to improved methods for inhibiting the formation and deposition of calcite scale in aqueous systems. In particular, the methods include injecting a composition into an aqueous system or wellbore. The composition includes a calcite scale inhibitor. The calcite scale inhibitor may be a copolymer of acrylic acid or methacrylic acid and an anionic monomer.

15 Claims, 2 Drawing Sheets

(56) References Cited

U.S. PATENT DOCUMENTS

| | | | |
|---|---|---|---|
| 4,659,481 A | 4/1987 | Chen | |
| 4,898,677 A * | 2/1990 | Brase | C02F 5/10 507/927 |
| 5,000,856 A * | 3/1991 | Chen | C02F 5/12 210/699 |
| 5,135,661 A | 8/1992 | Patel | |
| 5,268,108 A | 12/1993 | Gallup et al. | |
| 5,575,920 A | 11/1996 | Freese et al. | |
| 5,656,172 A * | 8/1997 | Kitz | C02F 5/08 210/698 |
| 6,641,754 B2 | 11/2003 | Buentello et al. | |
| 7,252,770 B2 | 8/2007 | Austin et al. | |
| 7,475,730 B2 | 1/2009 | Brown et al. | |
| 8,227,381 B2 | 7/2012 | Rodrigues et al. | |
| 9,127,236 B2 | 9/2015 | Silvernail et al. | |
| 9,221,700 B2 * | 12/2015 | Greene | C02F 5/10 |
| 9,574,130 B2 | 2/2017 | Gupta | |
| 9,816,927 B2 | 11/2017 | Nuutinen et al. | |
| 9,902,904 B2 | 2/2018 | Nuutinen et al. | |
| 9,994,764 B2 | 6/2018 | Howe et al. | |
| 10,253,244 B2 | 4/2019 | Holtsclaw et al. | |
| 10,280,101 B2 | 5/2019 | Miller et al. | |
| 11,447,410 B2 * | 9/2022 | Mantri | E21B 37/06 |
| 2011/0219769 A1 * | 9/2011 | Weres | C02F 5/00 60/641.1 |
| 2012/0032093 A1 * | 2/2012 | Moore | E21B 37/06 526/263 |
| 2012/0118575 A1 * | 5/2012 | Griffin | C02F 5/10 166/310 |
| 2012/0161068 A1 * | 6/2012 | Greene | C23F 14/02 252/180 |
| 2016/0011570 A1 * | 1/2016 | Gill | F03G 7/04 700/287 |
| 2016/0185636 A1 † | 6/2016 | Musale | |
| 2017/0022451 A1 | 1/2017 | Tamareselvy et al. | |
| 2018/0030000 A1 | 2/2018 | Gill et al. | |
| 2018/0072599 A1 † | 3/2018 | Padilla-Acevedo | |
| 2018/0327294 A1 * | 11/2018 | Mantri | C02F 5/12 |
| 2019/0177616 A1 † | 6/2019 | Harbindu | |
| 2020/0071205 A1 | 3/2020 | Dhawan et al. | |
| 2020/0071265 A1 | 3/2020 | Dhawan et al. | |

FOREIGN PATENT DOCUMENTS

| | | | | |
|---|---|---|---|---|
| EP | 1652825 | B1 | 9/2010 | |
| EP | 3149102 | B1 * | 8/2018 | C09K 8/528 |
| EP | 2970542 | B1 | 7/2019 | |
| EP | 3411416 | B1 | 4/2020 | |
| WO | 2005000747 | A2 | 1/2005 | |
| WO | 2011142954 | A2 | 11/2011 | |
| WO | WO2017099840 | A1 * | 6/2017 | C09K 8/528 |
| WO | 2019025305 | A1 | 2/2019 | |

OTHER PUBLICATIONS

Amjad et al, "Effect of Heat Treatment on the Performance of Deposit Control Polymers as Calcium Carbonate Inhibitors", Paper No. 07056, NACE Corrosion Conference & Expo, 2007. (Year: 2007).*

Gill, "Scale Control in Geothermal Brines-New Inhibitors for Calcium Carbonate and Silica Control", Publication in Transactions of Geothermal Resources Council 2008 Annual Meeting Oct. 5-8, 2008. (Year: 2008).*

English Translation of Patent Publication WO2018002323A1, Hans-Jurgen et al, published Jan. 2018. (Year: 2018).*

Li, Jin et al.,"Synthesis and structural characterization of MA/ AA/ AMPS copolymer and its inhibition mechanism to CaCO3 scale," Xi'an Shiyou Daxue Xuebao (Ziran Kexue Ban)—Journal of Xi'an Shiyou University (Natural Science Edition) 29(3) (May 2014) 7 pages (English abstract—first page).

Zafiropoulou, A. et al., "The effect of benzotriazoles on calcium carbonate scale formation," Journal of Crystal Growth 219 (2000) 477-480.

Zhou, J., "Research on Optimum Conditions of the Synthesis of the AA-HPA-AMPS Scale Inhibitor," Environmental Science Survey—CNKI Journal—32(1) (Jan. 2013) 4 pages (English abstract—last page).

Zou, Qi et al., "Water Stabilizer Selection for Circulating Water Bypass Flow Treatment System," Dianli Jianshe, Electric Power Construction 29(10) (Oct. 2008) 61-63 (English abstract—last page).

Cui, Kaixiang et al., "Synthesis and evaluation of an environment-friendly terpolymer CaCO3 scale inhibitor for oilfield produced water with better salt and temperature resistance," Journal of Applied Polymer Science 137(11) (Mar. 2020) DOI: 10.1002/app. 48460, 8 pages.

Daco-ag, Lorena M. et al., "Experiences with different calcite inhibitor in the Mahanagdong geothermal field." Proceedings World Geothermal Congress, Apr. 2010, Bali Indonesia, 25-29.

PCT International Search Report and Written Opinion for PCT/US2021/055959, dated Feb. 28, 2022, 15 pages.

Daco-ag, et al., Experiences with Different Calcite Inhibitor in the Mahanagdong Geothermal Field, Proceedings World Geothermal Congress 2010, Bali, Indonesia, Apr. 25-29, 2010.†

* cited by examiner
† cited by third party

CALCITE SCALE CONTROL AGENT FOR GEOTHERMAL WELLS

TECHNICAL FIELD

The present disclosure relates to methods and compositions for inhibiting or reducing calcite scale in aqueous systems.

BACKGROUND

Geothermal energy is energy in the form of heat within the earth's interior, which can be tapped using geothermal wells. The earth's interior contains an enormous supply of heat, but challenges remain in extracting the heat for generating energy. Geothermal energy moves towards the earth's surface by thermal conduction through solid rock. Thermal energy can also be transmitted towards the earth's surface by movement of molten rock or by circulation of fluid ($H_2O$ as steam or water) through inter-connected fractures and pores. Geothermal wells are in any instance relatively deep wells.

Geothermal brines and steam are generally used as the energy source. Geothermal brine is used in power generation, heating and electrical processes. Geothermal steam temperatures range from about 185° C. to about 370° C. (about 365° F. to about 700° F.). Steam is separated from the brine using flashing units. Low temperature brines can also be used to produce electricity binary units (secondary fluid units). The geothermal brines can have a salinity from less than about 1000 ppm to several hundred thousand ppm, and a content of non-condensable gases up to about 6 percent. Depending upon the salt content and application, geothermal fluids may be used directly or through a secondary fluid cycle. The use of geothermal energy as an energy source has risen in importance as other energy sources become less abundant and more expensive. This is a sustainable renewable source of energy, and unlike other renewable sources, geothermal energy is constantly available.

Mineral deposition is a major problem under the severe conditions encountered in the production of geothermal energy and can be a factor limiting the development of geothermal fields. Mineral deposition from the boiling geothermal fluid of a water-dominated reservoir is particularly a problem.

Calcite scale deposition in wells is a major problem. Calcite scales cause significant fouling problems when industrial waters contain high quantities of calcium carbonate and bicarbonate. Generally, industrial waters with high levels of calcium carbonate or bicarbonate contain at least about 5 ppm or up to about 500 ppm of dissolved carbonates and bicarbonates. Higher quantities of carbonates and bicarbonates may be present in the water in dissolved, dispersed, or colloidal forms. The buildup of calcite deposits over time can lead to a range of operational problems. For example, the deposits can hinder accurate determinations of pipeline structural integrity. To remove the deposits, the pipelines must be mechanically cleaned. The deposits can also interfere with the safe operation of pipeline valving systems, potentially leading to catastrophic system failures. Therefore, cleaning is common practice in pipeline networks containing such deposits.

The scale-deposit problems are presently being countered primarily by the down-hole addition of scale inhibitor chemicals, although other techniques are being implemented, such as acidizing produced fluids and adding carbon dioxide under pressure. Mechanical methods have also been explored.

BRIEF SUMMARY

A method for calcite scale inhibition or reduction in an aqueous system is provided. The method includes injecting a composition into a geothermal well. The composition includes a copolymer of acrylic acid (AA) or methacrylic acid and an anionic monomer.

In some aspects, the copolymer comprises AA.

In some aspects, the composition includes a polymaleic anhydride.

In some aspects, the polymaleic anhydride is hydrolyzed polymaleic anhydride.

In some aspects, the hydrolyzed polymaleic anhydride has a weight average molecular weight ranging from about 300 Da to about 1,000 Da.

In some aspects, the anionic monomer is 2-acrylamido-2-methylpropane sulfonic acid (AMPS), styrene sulfonic acid, 2-methyacrylimido-2-methylpropylsulfonic acid, vinyl sulfonic acid, sulfoalkyl acrylate, sulfoalkyl methacrylate, allyl sulfonic acid, 3-methacrylamido-2-hydroxypropylsulfonic acid, any salt thereof, or any combination thereof.

In some aspects, the copolymer is an AA/AMPS copolymer.

In some aspects, the weight average molecular weight of the copolymer is about 10,000 Da to about 30,000 Da.

In some aspects, the composition is added in an amount ranging from about 1 ppm to about 1,000 ppm.

In some aspects, the copolymer comprises from about 40% to about 80% by weight of acrylic acid and from about 20% to about 60% by weight of AMPS.

In some aspects, the composition further comprises a triazole.

In some aspects, the composition comprises about 5% to about 15% by weight of the copolymer, from about 30% to about 40% by weight of polymaleic anhydride in any form, and about 1% to about 10% by weight of a triazole.

In some aspects, the geothermal well is a geothermal production well.

In some aspects, the aqueous system is located in a geothermal power plant, and, in some aspects, the geothermal power plant is selected from the group consisting of a dry steam station, a flash steam station, and a binary cycle station.

In some aspects, the aqueous system comprises brine.

A method for calcite scale inhibition or reduction in a geothermal wellbore is also provided. The method includes injecting a composition into the wellbore, wherein the composition comprises a copolymer of AA or methacrylic acid and an anionic monomer.

In some aspects, the aqueous system comprises water having a temperature of about 50° C. to about 350° C. or about 100° C. to about 350° C.

The present disclosure also provides compositions. The compositions may include a copolymer of AA or methacrylic acid and an anionic monomer, a polycarboxylic acid, and a triazole.

Finally, the present disclosure provides the use of a composition comprising a copolymer of AA or methacrylic acid and an anionic monomer, a polycarboxylic acid, and a triazole for inhibiting calcite scale formation in a geothermal well.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE DRAWINGS

A detailed description of the invention is hereafter described with specific reference being made to the drawings in which.

DETAILED DESCRIPTION

Figure 1:
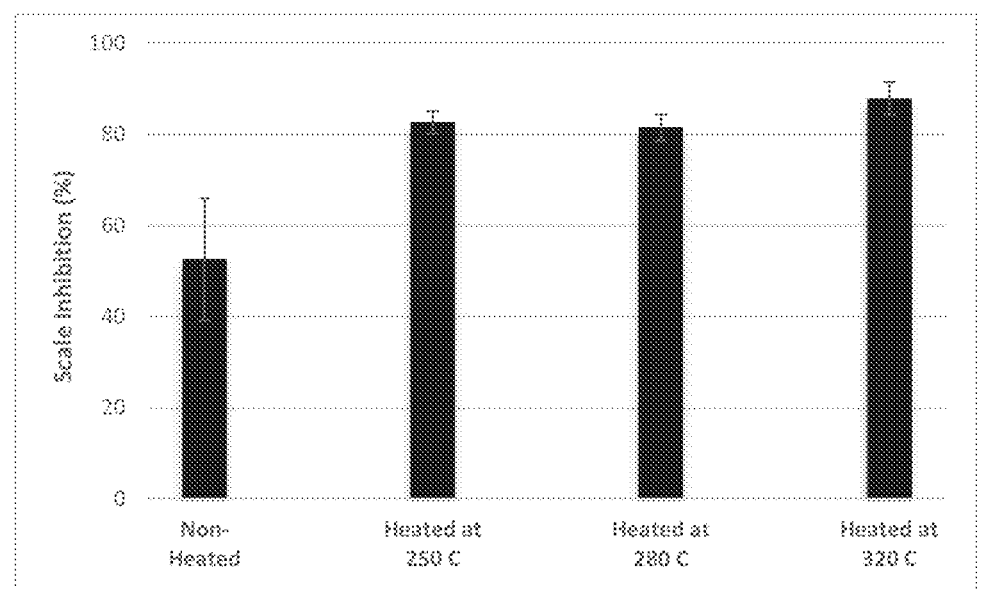
FIG. 1 shows calcite inhibition performance results.

Although the present disclosure provides references to various embodiments, persons skilled in the art will recognize that changes may be made in form and detail without departing from the spirit and scope of the invention. Various embodiments will be described in detail with reference to the figures. Reference to various embodiments does not limit the scope of the claims attached hereto. Additionally, any examples set forth in this specification are not intended to be limiting and merely set forth some of the many possible embodiments for the appended claims.

Unless otherwise defined, all technical and scientific terms used herein have the same meaning as commonly understood by one of ordinary skill in the art. In case of conflict, the present document, including definitions, will control. Methods and materials are described below, although methods and materials similar or equivalent to those described herein can be used in practice or testing of the present invention. All publications, patent applications, patents and other references mentioned herein are incorporated by reference in their entirety.

As used herein, the terms "comprise(s)," "include(s)," "having," "has," "can," "contain(s)," and variants thereof are intended to be open-ended transitional phrases, terms, or words that do not preclude the possibility of additional acts or structures. The singular forms "a," "and" and "the" include plural references unless the context clearly dictates otherwise.

The transitional phrase "comprising," which is synonymous with "including," "containing," or "characterized by," is inclusive or open-ended and does not exclude additional, un-recited elements, components, ingredients and/or method steps.

The transitional phrase "consisting of" excludes any element, component, ingredient, and/or method step not specified in the claim.

The transitional phrase "consisting essentially of" limits the scope of a claim to the specified elements, components, ingredients and/or steps, as well as those that do not materially affect the basic and novel characteristic(s) of the claimed invention.

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. The term "about" refers to the cited value being within the errors arising from the standard deviation found in their respective testing measurements, and if those errors cannot be determined, then "about" may refer to, for example, within 5% of the cited value.

Further, where "about" is employed to describe a range of values, for example "about 1 to 5" the recitation means "1 to 5" and "about 1 to about 5" and "1 to about 5" and "about 1 to 5" unless specifically limited by context.

As used herein, the term "substantially" means "consisting essentially of" and includes "consisting of." "Consisting essentially of" and "consisting of" are construed as in U.S. patent law. For example, a solution that is "substantially free" of a specified compound or material may be free of that compound or material, or may have a minor amount of that compound or material present, such as through unintended contamination, side reactions, incomplete purification or test methods used. A "minor amount" may be a trace, an unmeasurable amount, an amount that does not interfere with a value or property, or some other amount as provided in context. A composition that has "substantially only" a provided list of components may consist of only those components, or have a trace amount of some other component present, or have one or more additional components that do not materially affect the properties of the composition. Additionally, "substantially" modifying, for example, the type or quantity of an ingredient in a composition, a property, a measurable quantity, a method, a value, or a range, employed in describing the embodiments of the disclosure, refers to a variation that does not affect the overall recited composition, property, quantity, method, value, or range thereof in a manner that negates an intended composition, property, quantity, method, value, or range. Where modified by the term "substantially" the claims appended hereto include equivalents according to this definition.

As used herein, any recited ranges of values contemplate all values within the range and are to be construed as support for claims reciting any sub-ranges having endpoints which are real number values within the recited range. By way of example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5.

Unless specified otherwise, all molecular weights referred to herein are weight average molecular weights and all viscosities were measured at about 25° C. with neat (not diluted) polymers.

Aqueous systems may form deposits of scale that include a mixture of different compounds. Deposits containing calcite scale may be resistant to calcite scale inhibitors at high temperatures. The present disclosure relates to compositions for inhibiting or reducing calcite deposits in aqueous systems. In some embodiments, the aqueous system may be functioning at high temperatures. In some embodiments, the aqueous system may be a geothermal well or geothermal power plant. There is a growing demand for stable scale inhibitors to mitigate scaling at higher temperature in geothermal wells and surface equipment. The scale inhibitor's performance directly impacts the power generation in the geothermal plants as well as the maintenance cost.

In some embodiments of the present disclosure, a method is disclosed for calcite scale inhibition or reduction in an aqueous system. The method may include injecting a composition into the aqueous system. In some embodiments, the temperature of the water in the aqueous stream in the geothermal well when the composition is applied is in the range of about 50° C. to about 350° C. In some embodiments, the temperature of the water is about 100° C. to about 320 ° C., about 150° C. to about 320° C., about 200° C. to about 350° C., about 250° C. to 320° C., or about 270° C. to about 350° C.

In some embodiments, the aqueous system may comprise cooling waters, geothermal waters, salt water for desalinization purposes, industrial waters being prepared for boiler treatment and steam generation, downhole waters for petroleum crude recovery, pulp and paper mill waters, or mining and mineral processing waters.

In some embodiments, the composition is injected into equipment functioning at high temperatures. For example, the composition may be injected into a heat exchanger carrying water having a temperature between about 50° C. to about 350° C. In some embodiments, the temperature of the water in the heat exchanger is about 100° C. to about 320° C., about 150° C. to about 320° C., about 200° C. to about 350° C., about 250° C. to 320° C., or about 270° C. to about 350° C.

In some embodiments, the composition is injected into geothermal wells via feed lines that may be generally formed of stainless steel or a highly corrosion-resistant alloy. The feed lines pass through the upwardly flowing production stream and are the tubes through which the scale inhibitors are pumped downhole. The fluids of the production stream are extremely hot, having temperatures on the order of from about 200° C. to about 260° C. (about 400° F. to about 500° F.), and the feed line temperatures likewise may reach temperatures from about 200° C. to about 260° C.

In some embodiments, the composition may be injected at a point in the wellbore that may be from about 200 to about 400 feet below the lowest encountered scale formation site (generally the flash zone). This may be to ensure that the feed point is sufficiently ahead of the scale deposit area so that the inhibitor is adequately admixed in the production fluid when the first problem area is reached. A geothermal well itself may extend at least about 1 or 2 km (about 3,280 or 6,560 feet), and may be considerably deeper. Scale inhibitor feed lines that are from about 3,000 to about 5,000 feet long are not unusual. Scale inhibitor residence times in the feed lines may be from about 20 to about 30 minutes or longer. In some embodiments, the composition may be injected at a point in the wellbore that may be from about 400 feet to about 800 feet below the lowest encountered scale formation site. In some embodiments, the composition may be injected at a point in the wellbore that may be even further below about 800 feet below the lowest encountered scale formation site.

In some embodiments, the composition may be injected into a process unit of the aqueous system. For example, process units include, but are not limited to, a separator, a heat exchanger, a condenser, a reinjection well, and the like. The separator may contain water or brine, for example.

In some embodiments, the aqueous system may include brine. The water or brine may contain at least about 5 ppm or up to about 500 ppm of dissolved carbonates and bicarbonates.

In some embodiments, the brine may include iron, sulfide, and silica.

In some embodiments, the aqueous system may be a geothermal system. In some embodiments, the geothermal well is a geothermal production well. The geothermal system may also be a geothermal power plant, such as a dry steam station, a flash steam station, or a binary cycle station.

In some embodiments, the composition comprises a copolymer of AA or methacrylic acid and an anionic monomer. In some embodiments, the copolymer comprises AA. In some embodiments, the composition further comprises polymaleic anhydride.

Examples of anionic monomers include, but are not limited to, AMPS, styrene sulfonic acid, 2-methyacrylimido-2-methylpropylsulfonic acid, vinyl sulfonic acid, sulfoalkyl acrylate, sulfoalkyl methacrylate, allyl sulfonic acid, 3-methacrylamido-2-hydroxypropylsulfonic acid, and any salt thereof. In some embodiments, the anionic monomer is AMPS.

In some embodiments, the copolymer is an AA/AMPS copolymer. The amount of AA in the copolymer ranges from about 40% to about 80% by weight. In some embodiments, the amount of AA in the copolymer may be about 50% by weight, about 60% by weight, or about 70% by weight. The amount of AMPS in the copolymer may range from about 20% to about 60% by weight. In some embodiments, the amount of AMPS in the copolymer may be about 30% by weight, about 40% by weight, or about 50% by weight.

In some embodiments, the composition further comprises a triazole. Examples of triazoles include, but are not limited to, benzotriazole, tolyltriazole, butylbenzotriazole, halobenzotriazoles, halo-tolyltriazoles, or nitrated-triazoles. In some aspects, the additional corrosion inhibitor can be a 2-substituted benzimidazole.

The polymaleic anhydride may be hydrolyzed polymaleic anhydride. Examples of hydrolyzed polymaleic anhydride include, but are not limited to, one or more of the compounds of formulae I-IV.

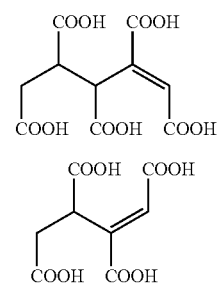

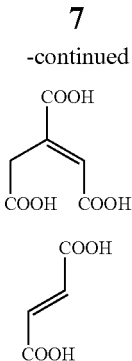

In some embodiments, the composition comprises from about 20% by weight to about 50% by weight of the polymaleic anhydride. In some embodiments, the composition comprises from about 30% by weight to about 40% by weight of the polymaleic anhydride.

In some embodiments, the composition comprises from about 1% by weight to about 20% by weight of the copolymer. In some embodiments, the composition comprises from about 5% by weight to about 15% by weight of the copolymer.

In some embodiments, the composition comprises from about 1% by weight to about 10% by weight of the triazole. In some embodiments, the composition comprises from about 2% by weight to about 6% by weight of the triazole.

In some embodiments, the composition comprises about 10% by weight of the copolymer, about 35% by weight of polymaleic anhydride, and about 4% by weight of the triazole.

In some embodiments, the composition is added in an amount ranging from about 1 ppm to about 1000 ppm, from about 1 ppm to about 700 ppm, from about 1 ppm to about 500 ppm, from about 1 ppm to about 300 ppm, from about 1 ppm to about 200 ppm, from about 1 ppm to about 100 ppm, from about 1 ppm to about 50 ppm, from about 100 ppm to about 1000 ppm, from about 250 ppm to about 1000 ppm, from about 500 ppm to about 1000 ppm, or from about 750 ppm to about 1000 ppm.

In some embodiments, the weight average molecular weight of the hydrolyzed polymaleic anhydride may range from about 300 Da to about 1,000 Da. In certain embodiments, the weight average molecular weight of the AA/AMPS copolymer is about 18,000 Da to about 20,000 Da. The weight average molecular weight of the copolymers may be determined using gel chromatography, for example.

In certain embodiments, a method is disclosed for calcite scale inhibition or reduction in a geothermal wellbore. The method may include injecting a composition into the wellbore. The composition may include a calcite scale inhibitor. The composition may comprise a copolymer of AA or methacrylic acid and an anionic monomer.

In some embodiments, the compositions of this disclosure may be injected into the aqueous system as aqueous solutions of scale inhibitor actives. Such compositions may contain from about 15% to about 70% by weight actives. In certain embodiments, the compositions may contain from about 20% to about 30% by weight actives. In some embodiments, the aqueous compositions of scale inhibitors may be introduced into the feed line of a geothermal well, for delivery downhole, at actives concentrations of about 1% to about 15% by weight. The actives concentration may be adjusted by, for example, injecting an aqueous diluent along with the composition.

In some embodiments, the composition may include additional additives, such as a hydrogen sulfide scavenger, a corrosion inhibitor, a dispersant, a gas hydrate inhibitor, a biocide, a surfactant, a solvent, an inert tracer, or any combination thereof.

In some embodiments, the composition may include one or more corrosion inhibitors, one or more other scale inhibitors, one or more fluorescent tracers, one or more water treatment polymers, one or more polyalkoxy compounds, or any other suitable additive or additional component. In alternative embodiments, such additives may be added simultaneously or sequentially with the polymers of the invention.

In some embodiments, the composition may include an inert tracer, making it compatible with fluorescent tracing technology, such as 3D TRASAR® technology (available from Nalco Water, an Ecolab Company, Naperville, Ill., USA). In some embodiments, an inert fluorescent tracer may be included in the composition to provide a means of determining a dosage level. A known proportion of the fluorescent tracer may be added either simultaneously or sequentially with the scale inhibitors in the composition. Effective inert fluorescent tracers may include those substances that are chemically non-reactive with other components in the system and that do not significantly degrade with time.

Representative inert fluorescent tracers include fluorescein or fluorescein derivatives; rhodamine or rhodamine derivatives; naphthalene sulfonic acids (mono-, di-, tri-, etc.); pyrene sulfonic acids (mono-, di-, tri-, tetra-, etc.); stilbene derivatives containing sulfonic acids (including optical brighteners); biphenyl sulfonic acids; phenylalanine; tryptophan; tyrosine; vitamin B2 (riboflavin); vitamin B6 (pyridoxin); vitamin E (a-tocopherols); ethoxyquin; caffeine; vanillin; naphthalene sulfonic acid formaldehyde condensation polymers; phenyl sulfonic acid formaldehyde condensates; lignin sulfonic acids; polycyclic aromatic hydrocarbons; aromatic (poly)cyclic hydrocarbons containing amine, phenol, sulfonic acid, carboxylic acid functionalities in any combination; (poly)heterocyclic aromatic hydrocarbons having N, O, or S; a polymer containing at least one of the following moieties: naphthalene sulfonic acids, pyrene sulfonic acids, biphenyl sulfonic acids, or stilbene sulfonic acids.

In some embodiments, the compositions may include additional scale inhibitors to disperse scales other than sulfide and silica. These additional scale inhibitors may include, but are not limited to, inorganic and organic polyphosphate, phosphonates, and polycarboxylates. These inhibitors may help inhibit or disperse other scales, such as calcium carbonate, calcium sulfate, calcium phosphate, calcium fluoride, barium sulfate, calcium oxalate, and the like.

In certain embodiments, the disclosed methods may be combined with other utilities known in the industry. Representative utilities include sensors for measuring the content of various additives in the system; dissolved or particulate contaminant sensors; other sensors based upon resistance, capacitance, spectroscopic absorbance or transmittance, calorimetric measurements, and fluorescence; and mathematical tools for analyzing sensor/controller results (e.g. multivariate analysis, chemometrics, on/off dosage control, PID dosage control, the like, and combinations thereof).

EXAMPLES

Three different compositions were evaluated for hydrothermal stability and performance. A list of the compositions and their main raw material components is given in Table 1.

TABLE 1

List of compositions with their active components

| Composition | Active components |
|---|---|
| 1 | Copolymer of AA/AMPS with less than 2% by weight of a HAPNQ tag |
| 2 | Hydrolyzed Polymaleic Anhydride |
| 3 | Copolymer of AA/AMPS with less than 2% by weight of a HAPNQ tag, poly(maleic acid), and benzotriazole |

The structure and preparation of HAPNQ used in compositions 1 and 3 is as published in U.S. Pat. No. 6,645,428 and incorporated by reference in the current application in its entirety. The chemical structure of HAPNQ is shown below.

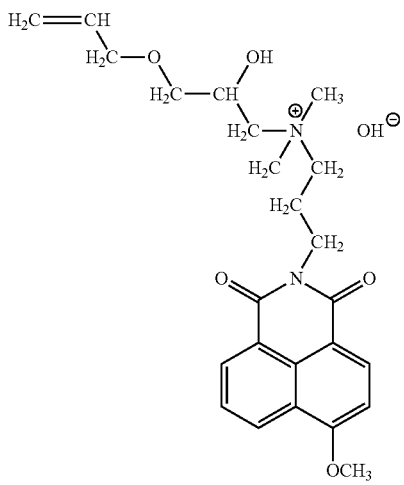

An advantage of the fluorescent monomers, such as HAPNQ, is that in their use in the formation of a tagged treatment polymer, the fluorescent monomer is not significantly affected by other structures in the polymer or by other ingredients in the system. Thus, the polymers are stable in the presence of chlorine and STABREX®, where STABREX® is the tradename for an oxidizing biocide, available from Nalco Water, an Ecolab Company. A further advantage of the tagged treatment polymers is that the spectral properties, i.e., both excitation and emission of the polymers, are in the near visible wavelength region (>370 nm), thus allowing the use of solid state instrumentation and potentially minimizing interferences that generally occur in the UV wavelength region.

Hydrothermal stability experiments were performed to evaluate the effect of temperature on molecular structure of the various scale inhibitors. A static scale inhibition test was performed to evaluate scale inhibitor performance using both non-heated and heated samples.

The first part of the experiment was conducted using a non-stirred Parr reactor placed in a box furnace. The Parr reactor is capable of handling maximum temperature of about 500° C. and maximum pressure of about 350 bar. A box furnace is used specifically for heating the Parr reactor to the desired temperature. The temperature of the Parr reactor was maintained by controlling the box furnace temperature. It was assumed that the temperature gradient between the reactor and the sample was negligible. Experiments were performed at about 280° C. to see the impact of heating on molecular structure and performance of scale inhibitor.

The composition was generally fed in ppm range (less than about 1% by weight); about 10% by weight of the product with about 90% deionized water was found to be good dilution sample to make meaningful conclusions from NMR analysis. Scale inhibitors were generally diluted before being pumped into the well to avoid clogging.

The samples were prepared by mixing about 10% by weight of compositions 1, 2, or 3 with about 90% DI water. About 50 ml of the sample was added into the Parr reactor and kept in the box furnace. The box furnace temperature was increased to about 280° C. in 1 hour, and then the temperature was maintained at about 280° C. for about another hour and then cooled down to room temperature in about 2 hours to ensure the pressure inside the reactor reached atmospheric condition (actual time the product was at high temperature for about 4 hours). Since this was a closed vessel, it was assumed that pressure inside the Parr reactor was equivalent to the saturation pressure of the sample.

In the geothermal industry, the production well has the highest temperature compared to other unit operations and formation of calcite scale is major issue. Static performance test experiments were performed for calcite scale. NACE test (TM0374-2007) procedure was used in the current study to evaluate the calcite inhibition performance efficiency of the scale inhibitors. The brine sample was prepared by mixing the calcium dominant brine sample and bicarbonate dominant brine sample. The details of the individual brine samples are shown in Table 2. The calculated ppm concentrations of each ion after mixing the calcium and bicarbonate brine samples are shown in Table 3. The calcium and bicarbonate dominant samples were purged with $CO_2$ for about 30 minutes before mixing as per NACE standard procedure.

TABLE 2

Brine details of calcium and bicarbonate dominant brine sample

| Calcium dominant brine (amount in 1L DI water) | Bicarbonate dominant brine (amount in 1L DI water) |
|---|---|
| $CaCl_2 \cdot H_2O$ about 12.15 g<br>$MgCl_2 \cdot 6H_2O$ about 3.68 g<br>NaCl about 33 g | $NaHCO_3$ about 7.36 g<br>NaCl about 33 g |

TABLE 3

Brine details of mixed sample for NACE Calcite test

| Ion | $Na^+$ | $Cl^-$ | $HCO_3^-$ | $Ca^{2+}$ | $Mg^{2+}$ |
|---|---|---|---|---|---|
| ppm | 14,093 | 23,441 | 2,672 | 1,653 | 220 |

It is important to note that the brine chemistry and the conditions used in NACE test were different from many of the actual geothermal brine chemistries. The test was chosen to compare the performance of heated versus non-heated samples. Dosages required to inhibit calcite scale for NACE chemistry do not represent the doses required at the actual geothermal sites.

The inhibition efficiency was calculated by the using the following equation:

$$\text{Inhibition}(\%) = \frac{C_a - C_b}{C_c - C_b} \times 100$$

where, $C_a$=$Ca^{2+}$ concentration in scale inhibitor treated sample after precipitation; $C_b$=$Ca^{2+}$ concentration in untreated (without scale inhibitor) sample after precipitation; $C_c$=$Ca^{2+}$ concentration in the blank before precipitation (no scale inhibitor and no bicarbonate brine).

Example 1

NMR analysis of the spectra suggests that the heat treatment resulted in the formation of a small molecule causing the sharp lines in the spectra. The small molecule most likely resulted from the hydrolysis of the AMPS functional group. There was a pH difference between the samples. Without being bound by any particular theory, it was hypothesized that the pH difference between samples was the reason for the difference in chemical shifts of the small molecule signals for the heated sample. NMR analysis suggests that polymers present were hydrolyzed into AA or acrylic acid/acrylamide copolymer.

This composition showed better performance after heating as illustrated in FIG. 1. Usually, performance decreases when the sample is heated to a higher temperature. However, the results are reversed in this instance. Performance experiments were repeated 3 times to confirm these results, and an increase in the performance trend for heated samples was observed. Without being bound by any particular theory, it is hypothesized that the increase in performance was mainly due to conversion of the active components to an acrylic group after heating, thereby enhancing calcite scale inhibition.

Example 2

Next, composition 2 was tested. Carbon NMR analysis of non-heated and heated samples showed evidence of polymer degradation. Though quantification was difficult, there was a loss of carbonyl groups. If there is decarboxylation, the generation of carbon dioxide would be expected, but additional carbonate was not observed in the heated sample. It is roughly estimated that the loss of carboxylic acid groups was in the range of about 20 mole percent. There are several additional aliphatic signals generated by heating the samples.

The non-heated composition showed reasonably good performance for calcite inhibition however, inhibition performance decreased after heating. These results align with NMR prediction. Considering this result, this composition was not stable at the tested temperature.

Example 3

Figure 2:
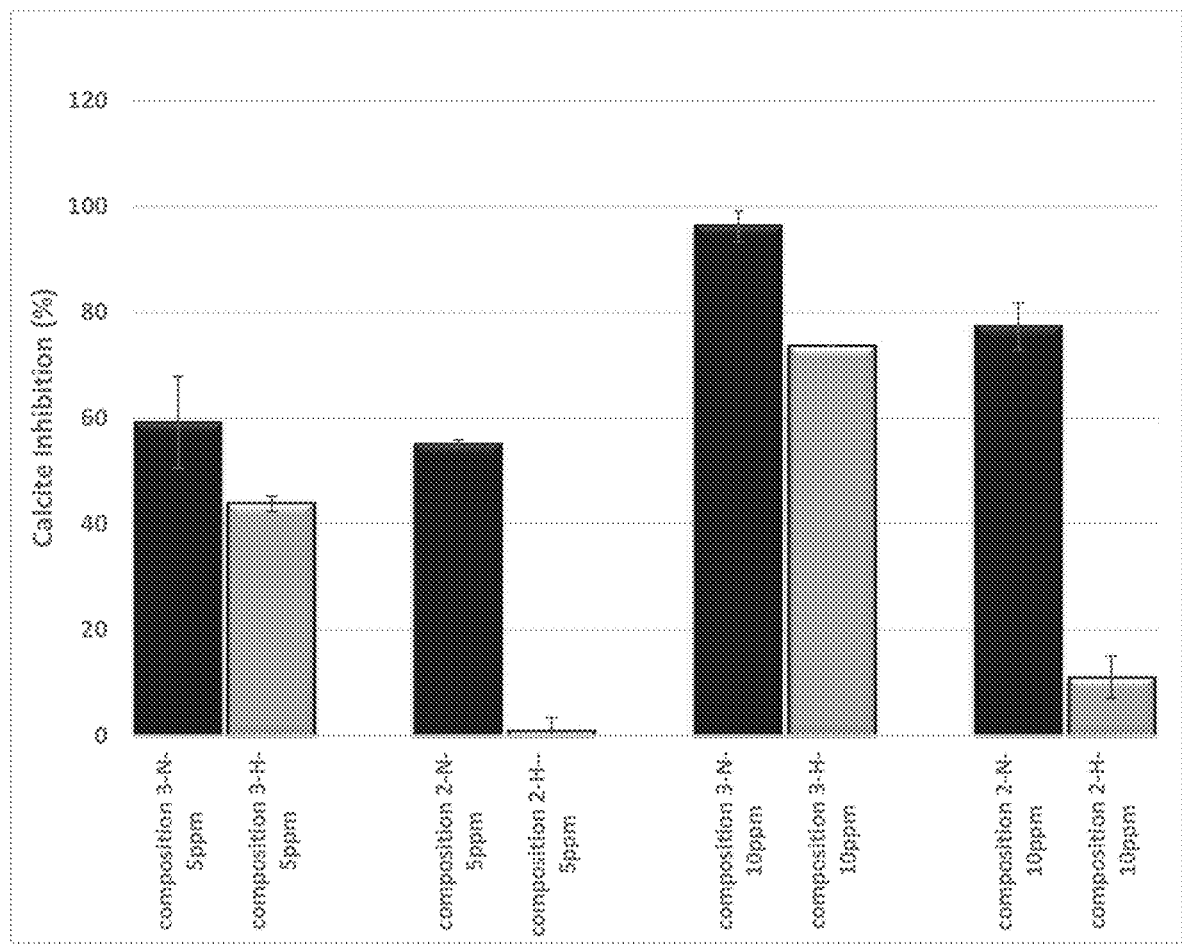
FIG. 2 shows calcite inhibition performance results with heated (-H-) and non-heated (-N-) hydrolyzed polymaleic anhydride and with a heated (-H-) and non-heated (-N-) composition which includes a copolymer of AA, AMPS, and 4-methoxy-N-(3-N',N'-dimethylaminopropyl)naphthalimide, 2-hydroxy-3-allyloxypropyl quat (HAPNQ tag). The composition also included poly(maleic acid) and benzotriazole.

In this example, composition 3 was tested. This composition contained two polymers: an AA/AMPS copolymer and a poly(maleic acid) along with benzotriazole. Carbon NMR analysis of the heated and non-heated composition indicates very minor degradation of the polymer based on temperature as illustrated in FIG. 2. The AA/AMPS polymer signals sharpened, which was due to a combination of the hydrolysis of some of the AMPS units and possibly the reduction of the molecular weight of the AA/AMPS polymer. The poly(maleic) acid polymer did not appear to be as degraded by these conditions as compared to the composition which hydrolyzed polymaleic anhydride as the lone active component. There is no strong evidence that the benzotriazole was degraded by these conditions. No significant amount of new aromatic signals was observed resulting from the benzotriazole component.

Performance data for calcite inhibition also confirmed the findings from NMR analysis. The performance for the heated composition was slightly lower than the non-heated composition. However, it was better than the performance of a composition that only had hydrolyzed polymaleic anhydride as its active ingredient.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a monomer" is intended to include "at least one monomer" or "one or more monomers."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method for calcite scale inhibition or reduction in an aqueous system, comprising:
    injecting a composition into a geothermal well, wherein the composition comprises
    i) a copolymer of acrylic acid (AA) or methacrylic acid and an anionic monomer; and
    ii) a polymaleic anhydride homopolymer;
    wherein the polymaleic anhydride has a weight average molecular weight of about 300 Da to about 1,000 Da; and
    wherein the anionic monomer is 2-acrylamido-2-methylpropane sulfonic acid (AMPS), styrene sulfonic acid, 2-methyacrylimido-2-methylpropylsulfonic acid, vinyl sulfonic acid, sulfoalkyl acrylate, sulfoalkyl methacrylate, allyl sulfonic acid, 3-methacrylamido-2-hydroxypropylsulfonic acid, any salt thereof, or any combination thereof.

2. The method of claim 1, wherein the aqueous system comprises water having a temperature of about 50° C. to about 350° C.

3. The method of claim 1, wherein the aqueous system comprises water having a temperature of about 100° C. to about 350° C.

4. The method of claim 1, wherein the copolymer comprises AA.

5. The method of claim 1, wherein the polymaleic anhydride homopolymer is hydrolyzed.

6. The method of claim 1, wherein the copolymer is an AA/AMPS copolymer.

7. The method of claim 6, wherein the weight average molecular weight of the AA/AMPS copolymer is about 10,000 Da to about 30,000 Da.

8. The method of claim 1, wherein the composition is added in an amount ranging from about 1 ppm to about 1,000 ppm.

9. The method of claim 1, wherein the copolymer comprises from about 40% to about 80% by weight of AA and from about 20% to about 60% by weight of AMPS.

10. The method of claim 1, wherein the composition further comprises a triazole.

11. The method of claim 10, wherein the composition comprises about 5% to about 15% by weight of the copolymer, from about 30% to about 40% by weight of polymaleic anhydride homopolymer in any form, and about 1% to about 10% by weight of the triazole.

12. The method of claim 1, wherein the geothermal well is a geothermal production well.

13. The method of claim 1, wherein the aqueous system is a geothermal power plant, optionally wherein the geothermal power plant is selected from the group consisting of a dry steam station, a flash steam station, and a binary cycle station.

14. The method of claim 1, wherein the aqueous system comprises brine.

15. A method for calcite scale inhibition or reduction in a geothermal wellbore, comprising:
  injecting a composition into the wellbore, wherein the composition comprises
  i) a copolymer of AA or methacrylic acid and an anionic monomer; and
  ii) a polymaleic anhydride homopolymer;
  wherein the polymaleic anhydride homopolymer has a weight average molecular weight of about 300 Da to about 1,000 Da; and
  wherein the anionic monomer is 2-acrylamido-2-methylpropane sulfonic acid (AMPS), styrene sulfonic acid, 2-methyacrylimido-2-methylpropylsulfonic acid, vinyl sulfonic acid, sulfoalkyl acrylate, sulfoalkyl methacrylate, allyl sulfonic acid, 3-methacrylamido-2-hydroxypropylsulfonic acid, any salt thereof, or any combination thereof.

* * * * *